United States Patent
Toyota

(10) Patent No.: US 6,850,473 B1
(45) Date of Patent: Feb. 1, 2005

(54) OPTICAL DISC DEVICE AND METHOD FOR CONTROLLING THE SAME

(75) Inventor: Masaki Toyota, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 619 days.

(21) Appl. No.: 09/830,675

(22) PCT Filed: Aug. 30, 2000

(86) PCT No.: PCT/JP00/05853
§ 371 (c)(1),
(2), (4) Date: Jul. 31, 2001

(87) PCT Pub. No.: WO01/16946
PCT Pub. Date: Mar. 8, 2001

(30) Foreign Application Priority Data

Aug. 31, 1999 (JP) .......................................... 11-246355

(51) Int. Cl.[7] ................................................ G11B 7/00
(52) U.S. Cl. ................................. 369/53.24; 369/30.1
(58) Field of Search ........................ 369/44.29, 44.32, 369/47.29, 47.4, 47.42, 53.3, 30.15, 30.16, 44.28, 53.24, 53.29, 53.37, 30.1, 30.12; 360/78.05

(56) References Cited

U.S. PATENT DOCUMENTS 4,817,068 A * 3/1989 Yamauchi ................ 369/30.36
5,363,364 A * 11/1994 Torazawa et al. ....... 369/124.06

FOREIGN PATENT DOCUMENTS

| EP | 482645 | 4/1992 |
| JP | 63-181178 | 7/1988 |
| JP | 4-162250 | 6/1992 |
| JP | 5-225580 | 9/1993 |
| JP | 2000-331353 | 11/2000 |

* cited by examiner

Primary Examiner—Thang V. Tran
(74) Attorney, Agent, or Firm—Wenderoth, Lind & Ponack, L.L.P.

(57) ABSTRACT

An optical disc apparatus, such as CD-WO and the like, realizes stabilization of a waiting state after recording to an optical disc, and realizes stabilization during switching of rotational speed. The optical disc apparatus has a CPU for performing an administration which makes a laser pickup follow a track in a predetermined area on the optical disc, seek a head of the area when the laser pickup exceeds the area, and repeat the following operation and the seeking operation until a next command is issued.

16 Claims, 3 Drawing Sheets

OPTICAL DISC DEVICE AND METHOD FOR CONTROLLING THE SAME

TECHNICAL FIELD

The present invention relates to an optical disc apparatus and, more particularly, to one which realizes the stabilization of the waiting state after recording, and realizes the stabilization of the switching of rotational speed.

BACKGROUND ART

As examples of the optical disc apparatuses which record data into an optical disc, there are the CD-WO (writable type) and CD-RW (rewritable type). In these apparatuses, a laser pickup is used to record data to the optical disc, and recording is started with setting the output of the laser pickup at a recording power while acquiring the time information by employing a wobble signal previously present on the optical disc.

After the completion of the recording operation, the output of the laser pickup is set at a reading power and the laser pickup is returned to the location just after the recording process or to a predetermined location, thereby to hold the location information (hereinafter, referred to as "holdtracking") or switch the rotation speed. Thus, the optical disc apparatus enters a waiting state until next recording.

However, in the conventional optical disc apparatus, when a hold tracking is performed after the completion of recording operation, the reading of a wobble signal in a recorded part is deteriorated by the influence of a RF signal in the recorded part, thereby resulting in an incapability of performing the hold tracking operation at the neighborhood of the position where the recording operation is completed.

On the other hand, when the laser pickup is moved to the lead-in area and the like after the completion of the recording operation in order to perform a stable hold tracking, there is a problem in that the time required for recording increases as a whole in a case where the seeking distance at restarting recording is long or when the seeking is performed frequently.

Further, when the switching of rotational speed is performed after the completion of the recording operation, a rotational speed switching error occurs due to the presence of the RF signal, thereby interrupting the next recording or reading operation.

The present invention is made in view of the above-mentioned problems, and has for its object to provide an optical disc apparatus which stabilizes the waiting state after performing recording to an optical disc without increasing the recording time as a whole, and which realizes the stabilization of the switching of rotational speed.

SUMMARY OF THE INVENTION

According to the present invention, there is provided an optical disc apparatus which performs recording or reading of data by irradiating laser light from a laser pickup onto an optical disc and which comprises a control means for performing a play control which makes the laser pickup follow a track of a predetermined area on the optical disc after the recording of data is completed, seek the head of the area when the laser pickup exceeds the area, and repeat the above-described following operation and seeking operation until a next command is issued.

Thereby, the waiting state after recording to the optical disc can be stabilized without increasing the recording time as a whole.

According to the present invention, there is provided an optical disc apparatus in which the head of the above-described area is at the neighborhood of the position where the recording operation is completed.

When the optical disc apparatus restarts the recording operation, it is possible to move in a short time to the head of the area where the recording is to be performed, thereby resulting in reducing the recording time as a whole.

According to the present invention, there is provided an optical disc apparatus provided with a detection means for detecting a consecutive recorded area where data are continuously recorded for a constant period of time on the optical disc or a consecutive non-recorded area where no data are recorded for a constant period of time when the laser pickup is following the track of the predetermined area, and the control means controls the laser pickup so that it should perform a hold tracking in the consecutive recorded area or in the consecutive non-recorded area instead of performing the above-described play control when the detection means detects the consecutive recorded area or the consecutive non-recorded area.

Thereby, the waiting state after performing recording to the optical disc can be stabilized without performing the following operation of the laser pickup.

According to the present invention, there is provided an optical disc apparatus in which the control means performs a control of switching of rotational speed of the optical disc at the hold tracking.

Thereby, the stabilization of the switching of rotational speed at the hold tracking can be realized.

According to the present invention, there is provided an optical disc apparatus in which when the detection means receives the next command while detecting the consecutive recorded area or the consecutive non-recorded area on the optical disc, the detection means immediately interrupts the detection.

Thereby, it is possible to respond to next command issued from the host computer immediately.

According to the present invention, there is provided a method for controlling the optical disc apparatus which performs recording or reading of data by irradiating laser light onto the optical disc from the laser pickup and which comprises a first step which makes the laser pickup follow the track of the predetermined area on the optical disc after recording of data is completed, seek the head of the area when the laser pickup exceeds the area, and repeat the above-described following operation and the above-described seeking operation until a next command is issued.

Thereby, the waiting state after performing recording to the optical disc can be stabilized without increasing the recording time as a whole.

According to the present invention, there is provided a method for controlling the optical disc apparatus in which the head of the area is at the neighborhood of the position where the recording operation is completed.

When the optical disc apparatus restarts the recording operation, it is possible to move in a short time to the head of the area where the recording is to be performed, thereby resulting in reducing the recording time as a whole.

According to the present invention, there is provided a method for controlling the optical disc apparatus which detects the consecutive recorded area where data are continuously recorded for a constant period of time on the optical disc or a consecutive non-recorded area where no data are recorded for a constant period of time in the first step, when the laser pickup is following the track of the predetermined area, and which performs the hold tracking in the consecutive recorded area or in the consecutive non-recorded area in a second step when the consecutive recorded area or the consecutive non-recorded area is detected in the first step.

Thereby, the waiting state after performing recording to the optical disc can be stabilized without performing the following operation of the laser pickup.

According to the present invention, there is provided a method for controlling the optical disc apparatus in which the rotation speed of the optical disc is switched in the second step.

Thereby, the stabilization of the switching of rotational speed at the hold tracking can be realized.

According to the present invention, there is provided a method for controlling the optical disc apparatus in which when receiving the next command while detecting the consecutive recorded area or the consecutive non-recorded area in the first step, the detection is interrupted immediately.

Thereby, it is possible to respond to a next command issued from the host computer immediately.

DETAILED DESCRIPTION OF THE INVENTION (Embodiment 1)

Hereinafter, the optical disc apparatus and a control method thereof according to a first embodiment of the present invention will be described with reference to the drawings.

Figure 1:
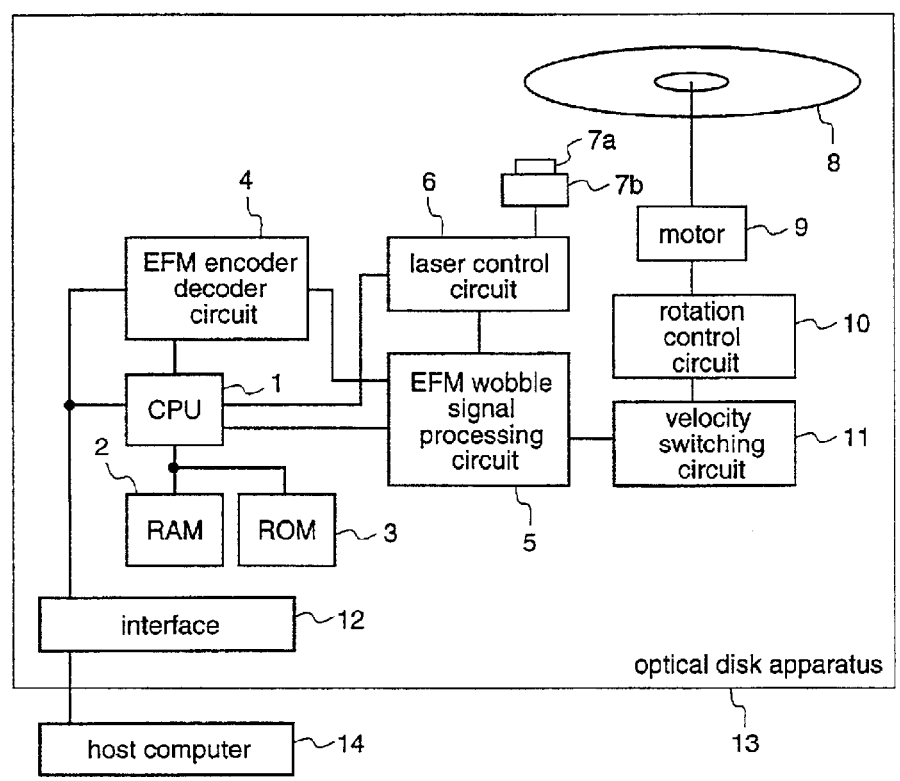
FIG. 1 is a block diagram illustrating the construction of the optical disc apparatus according to a first embodiment of the present invention.

FIG. 1 is a block diagram illustrating the construction of an optical disc apparatus according to the first embodiment of the present invention.

In FIG. 1, the optical disc apparatus 13 is provided with CPU 1, RAM 2, ROM 3, an EFM encoder decoder circuit 4, an EFM wobble signal processing circuit 5, a laser control circuit 6, a laser pickup 7a, a pickup drive part 7b, a motor 9, a rotation control circuit 10, a velocity switching circuit 11 and an interface 12.

The CPU 1 is a central arithmetic processing unit which controls the EFM encoder decoder circuit 4, the EFM wobble signal processing circuit 5, the laser control circuit 6 and the like to perform recording of data to the optical disc 8 and reading out of data from the optical disc 8. The RAM 2 is a random access memory which can record and have data read therefrom. The ROM 3 is a read-only memory which can only have data read therefrom, wherein a program and the like by which the CPU 1 executes instructions are stored.

The EFM (Eight to Fourteen Modulation) encoder decoder circuit 4 receives recording data from the interface 12, converts the data, then outputs it to the EFM wobble signal processing circuit 5. Further, the EFM encoder decoder circuit 4 receives data from the EFM wobble signal processing circuit 5, converts the data, then outputs it to the interface 12.

The EFM wobble signal processing circuit 5 switches the velocity of the optical disc 8 by controlling the velocity switching circuit 11 on receipt of an instruction from the CPU 1. Further, the EFM wobble signal processing circuit 5 receives data from the EFM encoder decoder circuit 4 or the laser control circuit 6, performs D/A conversion or A/D conversion to the data, and then, outputs it to the laser control circuit 6 or the EFM encoder decoder circuit 4. Furthermore, the EFM wobble signal processing circuit 5 judges whether the signal read from the optical disc 8 is an EFM signal or not.

The laser control circuit 6 controls the laser pickup 7a and the pickup drive part 7b so that they perform recording of data to the optical disc apparatus 8 or reading of data from the optical disc apparatus 8. The laser pickup 7a performs recording of data to the optical disc 8 at a recording power, and performs reading of data from the optical disc 8 at a reading power. The pickup drive part 7b drives the laser pickup 7a in the radius direction of the optical disc B. The motor 9 rotates the optical disc 8. The motor rotation control circuit 10 controls the rotation of the motor 9. The velocity switching circuit 11 switches the rotational speed of the optical disc 8 by giving an instruction to the motor rotation control circuit 10. The optical disc apparatus 13 and the host computer 14 are connected with each other through the interface 12.

Next, the operation of the optical disc apparatus 13 and a method for controlling the optical disc apparatus 13 according to the first embodiment of the present invention will be described.

When the optical disc 8 is inserted into the optical disc apparatus 13, the CPU 1 instructs the rotation control circuit 10 through the EFM wobble signal processing circuit 5 and the velocity switching circuit 11 to spin up the motor 9. The laser pickup 7a irradiates laser light onto the optical disc 8 to thereby generate the RF signal which consists of the light intensity of the reflected light, and the RF signal (EFM signal) is delivered to the EFM wobble signal processing circuit 5 through the laser control circuit 6.

Figure 2:
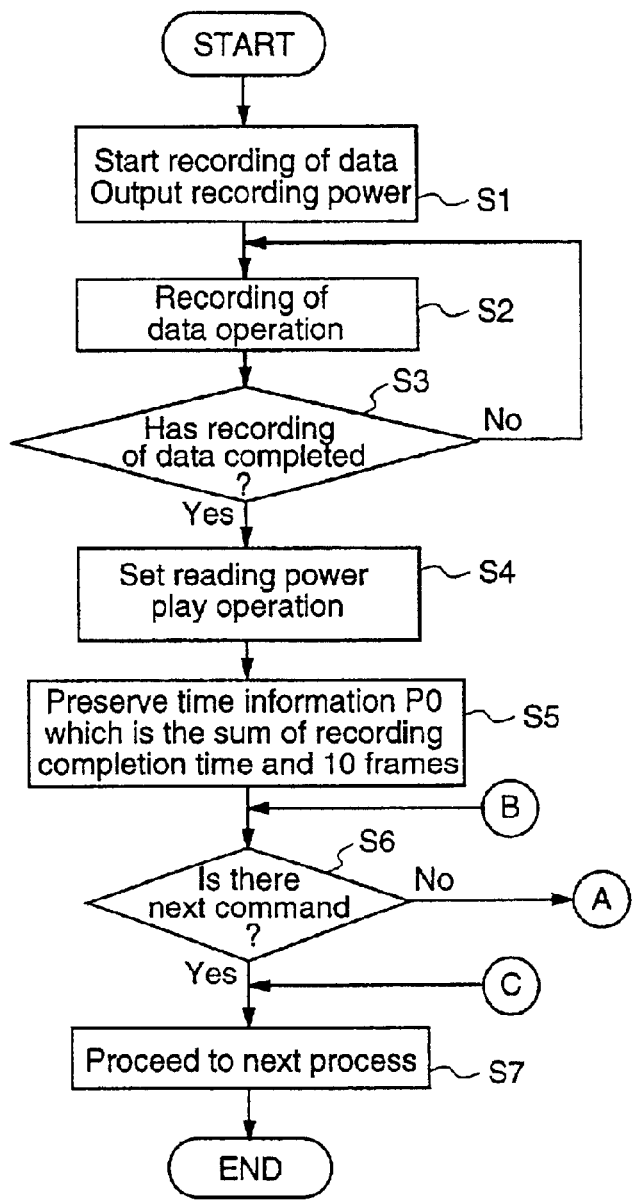
FIG. 2 is a flowchart illustrating the operation of the optical disc apparatus according to the first embodiment of the present invention.
Figure 3:
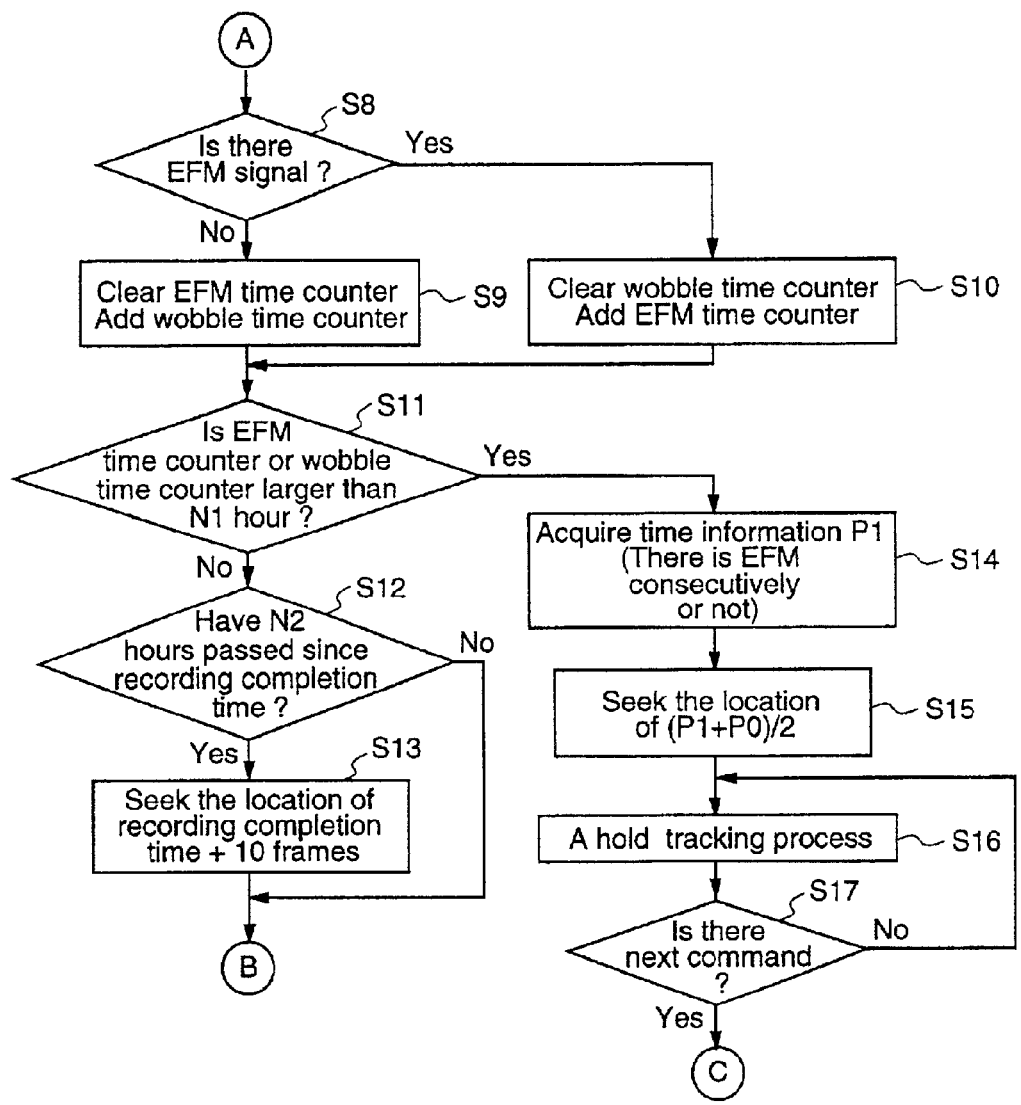
FIG. 3 is a flowchart illustrating the operation after the completion of recording process of the optical disc apparatus according to the first embodiment of the present invention.

FIG. 2 and FIG. 3 show flowcharts illustrating recording processes in the optical disc apparatus 13. The CPU 1 controls those processes directly or indirectly when nothing is particularly specified in each process. The indirect control means a control such that the CPU 1 controls the velocity switching circuit 11 through the EFM wobble signal processing circuit 5.

In step S1 shown in FIG. 2, the optical disc apparatus 13 starts the recording of data on receipt of an instruction from the host computer 14. The CPU 1 instructs the laser control circuit 6, whereby the output of recording power is outputted from the laser pickup 7a to the optical disc 8.

In step S2, the CPU 1 makes the EFM encoder decoder circuit 4 receive the recording data from the host computer 14. The data converted in the EFM encoder decoder circuit 4 are recorded into the optical disc 8 through the EFM wobble signal processing circuit 5, the laser control circuit 6, and the laser pickup 7a.

In step S3, it is judged whether the recording of data is completed, and when the recording of data is continuing, the process of step S2 is repeated.

When the recording of data is completed, the laser control circuit 6 is controlled so as to set the laser pickup 7a at the reading power at step S4. Then, the play reproduction operation which makes the laser pickup 7a follow the track of the optical disc 8 is continued.

In step S5, the time information P0 which is the sum of recording completion time and 10 frames is preserved in RAM 2. By the way, "time" such as recording completion time according to the first embodiment means time code which can be obtained from the EFM signal in the recorded area or from the wobble signal in the non-recorded area on the optical disc 8. It also has significance as location information (address) on the optical disc 8. By the way, while it is impossible to obtain the absolute value of the time code from the wobble signal in the non-recorded area, it is possible to obtain the relative value of the time code. However, the absolute time (absolute address) can be calculated by adding an offset value of the time code obtained from the wobble signal to the time code (recording completion time) of the location at which recording is completed. The time which is to be added to recording completion time is not required to be 10 frames if the location at which recording is completed and the location of the time information P0 are far enough apart from each other so that they can be distinguished.

In step S6, it is judged whether there is a next command from the host computer 14.

When a command issued from the host computer 14 is received, it proceeds to the next process of the step S7 immediately by interrupting a series of processes.

In the case where no command is received, it proceeds to the step S8. In step S8, the signal which is read out from the optical disc 8 by the laser pickup 7a is inputted to the EFM wobble signal processing circuit 5 after being passed through the laser control circuit 6. Then, the EFM wobble signal processing circuit 5 judges whether the inputted signal is an EFM signal or not.

When the EFM signal is not inputted to the EFM wobble signal processing circuit 5, the data region read by the laser pickup 7a is in the state of non-recordation, and therefore, the EFM time counter stored in RAM 2 is cleared and the wobble time counter which is also stored in RAM 2 is added in step S9.

On the other hand, when an EFM signal is inputted to the EFM wobble signal processing circuit 5, the data region read by the laser pickup 7a is in the state of data recordation, and therefore, the wobble time counter stored in RAM 2 is cleared and the EFM time counter which is also stored in RAM 2 is added in step S10.

In step S11, it is judged whether the EFM time counter or the wobble time counter is larger than a constant value N1. The constant value N1 is previously stored in ROM 3.

When both the EFM time counter and the wobble time counter are less than the constant value N1, it is judged in step S12 if the time information of the location which is being read then has passed N2 hours since the time when the recording was completed. The time information is controlled separately from the EFM time counter or the wobble time counter. The N2 is previously stored in ROM 3 as well as N1.

When N2 hours have passed since the time when recording was completed, the laser pickup 7a seeks the location which is the sum of recording completion time and 10 frames in step S13, and returns to step S6 again. When N2 hours have not passed, it returns to step S6 while continuing the play operation.

The processes of step S8~S13 and S6 are repeated until the wobble time counter or the EFM time counter become larger than N1 hour, or the next command from the host computer 14 is inputted. The play operation is continued in the processes of step S8~S12. Because the processes of step S8~S13 and S6 are repeated, in the case where the next command is issued (step S6), it is possible to proceed to the processing of the command (step S7) immediately, even when detecting the consecutive recorded area or the consecutive non-recorded area (step S8~S11). An example of the processing of the command is recording processing of data or the like.

In step S11, when EFM time counter or wobble time counter is larger than constant value N1, the time information P1 at that location is acquired at step S14. In this way, it is possible to detect the consecutive recorded area where a recording state is continued for a constant period of time N1 or detect a consecutive non-recorded area where no recording state is continued for a constant period of time N1.

Next, in step S15, the laser pickup 7a seeks the location of the time information (P1+P0)/2 which is in the center of the above-described area.

In step S16, the hold tracking processing is performed at the location of the time information (P1+P0)/2. It is obvious that the recorded area and the non-recorded area are not mixed at the location of the time information (P1+P0)/2, whereby it is possible to perform the stable hold tracking.

In step S17, it is judged whether there is a next command or not, and when there is a next command, the processing of step S7 is carried out and the processing is completed. In the case where next command is not issued, the hold tracking processing of step S16 is continued until the next command is issued.

Further, it is possible to switch the rotational speed of the optical disc 8, if necessary, at the hold tracking in step S16. In this location, the recorded area and the non-recorded area are not mixed as described above. Therefore, it is possible to switch the rotational speed stably.

As shown above, in the optical disc apparatus 13 according to the first embodiment of the present invention, it is possible to realize a stable hold tracking, and if not, it is possible to reduce a track blank from occurring due to the influence of the RF signal by the play operation, whereby the waiting state after recording to the optical disc 8 can be stabilized without increasing the recording time as a whole. The stability is caused by performing a processing of monitoring the presence of RF signal (EFM signal), detecting the non-recorded area continuing for a constant period of time or the recorded area continuing for a constant period of time on the optical disc apparatus 8 with the EFM wobble signal processing circuit 5 and the CPU 1 operating as a detection means, and performing a hold tracking after seeking the above-mentioned areas, when recording operation to the optical disc 8 is completed. Or the stability is caused by making a constant area perform the play operation without performing a hold tracking, seeking the recording completion location (P0) when exceeding the constant area and making the constant area perform the play operation again, and keeping the operation until next command is issued, when recording is completed.

Further, it is possible to realize the stabilization of the rotational speed by performing the hold tracking processing in the non-recorded area continuing for a constant period of time or the recorded area continuing for a constant period of time.

By the way, according to the first embodiment of the present invention, it was described in step S8~S11 and in step S14~S17 that when the EFM time counter or the wobble time counter is larger than the constant value N1, a stable hold tracking processing is performed at the location of time information (P1+P0)/2 in step S8~S11 and in step S14~S17. However, it is OK only to repeat an operation of returning to the location of time information P0 when reaching the location which has passed N2 hours since the recording completion time (step S12~13) until next command is issued without performing the hold tracking processing.

Further, a constant area repeats the play operation in step S6 and step S8–S13, and the location of the head of the area on the optical disc 8 which repeats the play operation is not limited to the location of the time information P0, even when the head of the area is at neighborhood of the location where recording is completed.

It was described in step S16 that the hold tracking is performed at the location of the time information (P1+P0)/2, but it is only an example. For instance, the stable hold tracking processing can be performed at the location which is a little bit away from the time information (P1+P0)/2, if only the processing is performed at the location which locates between the time information P0 and the time information P1. Therefore, the location at which the hold tracking processing of step S16 is performed is not limited to the location of the time information (P1+P0)/2.

APPLICABILITY IN INDUSTRY

As described above, the optical disc apparatus and a control method thereof according to the present invention are suitable for the optical disc apparatus which performs recording of data to a writable optical disc.

What is claimed is:

1. An optical disc apparatus for performing recording or reading of data on an optical disc, the optical disc apparatus comprising:
    a laser pickup operable to irradiate laser light onto the optical disc;
    a control means for performing a play control which makes the laser pickup follow a track of a predetermined area on the optical disc after a recording of data is completed, seek a head of the predetermined area when the laser pickup exceeds the predetermined area, and repeat the following operation and the seeking operation until a next command is issued; and
    a detection means for detecting a consecutive recorded area where data are continuously recorded for a constant period of time on the optical disc or detecting a consecutive non-recorded area where no data are recorded for a constant period of time when the laser pickup is following the track of the predetermined area, wherein
    the control means controls the laser pickup to perform a hold tracking in the consecutive recorded area or in the consecutive non-recorded area, respectively, when the detection means detects the consecutive recorded area or the consecutive non-recorded area.

2. The optical dick apparatus as defined in claim 1, wherein the control means performs a control of switching of a rotation speed of the optical disc at the hold tracking.

3. The optical disc apparatus as defined in claim 1, wherein when the detection means receives the next command while detecting the consecutive recorded area or the consecutive non-recorded area on the optical disc, the detection means interrupts the detection immediately.

4. A method for controlling an optical disc apparatus having a laser pickup for recording or reading data by irradiating laser light onto an optical disc, the method comprising:
    following a track of a predetermined area on the optical disc with the laser pickup after a recording of data is completed;
    seeking a head of the predetermined area when the laser pickup exceeds the predetermined area;
    repeating the following operation and the seeking operation until a next command is issued;
    detecting a consecutive recorded area where data are continuously recorded for a constant period of time on the optical disc or a consecutive non-recorded area where no data are recorded for a constant period of time, when the laser pickup is following the track of the predetermined area; and
    performing a hold tracking in the consecutive recorded area or in the consecutive non-recorded area, respectively, when the consecutive recorded area or the consecutive non-recorded area is detected.

5. The method for controlling the optical disc apparatus as defined in claim 4, further comprising switching a rotation speed of the optical disc is at the hold tracking.

6. The method for controlling the optical disc apparatus as defined in claim 4, further comprising when receiving the next command while detecting the consecutive recorded area or the consecutive non-recorded area, interrupting the detection immediately.

7. The optical disc apparatus as defined in claim 2, wherein when the detection means receives the next command while detecting the consecutive recorded area or the consecutive non-recorded area on the optical disc, the detection means interrupts the detection immediately.

8. An optical disc apparatus for performing recording or reading of data on an optical disc, the optical disc apparatus comprising:
    a laser pickup operable to irradiate laser light onto the optical disc;
    a control means for performing a play control which makes the laser pickup follow a track of a predetermined area on the optical disc after a recording of data is completed, seek a head of the predetermined area when the laser pickup exceeds the predetermined area, and repeat the following operation and the seeking operation until a next command is issued; and
    a detection means for detecting a consecutive recorded area where data are continuously recorded for a constant period of time on the optical disc or detecting a consecutive non-recorded area where no data are recorded for a constant period of time when the laser pickup is following the track of the predetermined area, wherein
    the head of the predetermined area is in a neighborhood of a position where the recording operation is completed, and
    the control means controls the laser pickup to perform a hold tracking in the consecutive recorded area or in the consecutive non-recorded area, respectively, when the detection means detects the consecutive recorded area or the consecutive non-recorded area.

9. The optical dick apparatus as defined in claim 8, wherein the control means performs a control of switching of a rotation speed of the optical disc at the hold tracking.

10. The optical disc apparatus as defined in claim 9, wherein when the detection means receives the next command while detecting the consecutive recorded area or the consecutive non-recorded area on the optical disc, the detection means interrupts the detection immediately.

11. The optical disc apparatus as defined in claim 8, wherein when the detection means receives the next command while detecting the consecutive recorded area or the consecutive non-recorded area on the optical disc, the detection means interrupts the detection immediately.

12. The method for controlling the optical disc apparatus as defined in claim 5, further comprising when receiving the next command while detecting the consecutive recorded area or the consecutive non-recorded area, interrupting the detection immediately.

13. A method for controlling an optical disc apparatus having a laser pickup for recording or reading data by irradiating laser light onto an optical disc, the method comprising:

following a track of a predetermined area on the optical disc with the laser pickup after a recording of data is completed;

seeking a head of the predetermined area when the laser pickup exceeds the predetermined area;

repeating the following operation and the seeking operation until a next command is issued;

detecting a consecutive recorded area where data are continuously recorded for a constant period of time on the optical disc or a consecutive non-recorded area where no data are recorded for a constant period of time, when the laser pickup is following the track of the predetermined area; and performing a hold tracking in the consecutive recorded area or in the consecutive non-recorded area, respectively when the consecutive recorded area or the consecutive non-recorded area is detected, wherein the head of the predetermined area is in a neighborhood of a position where the recording operation is completed.

14. The method for controlling the optical disc apparatus as defined in claim 13, further comprising switching a rotation speed of the optical disc at the hold tracking.

15. The method for controlling the optical disc apparatus as defined in claim 14, further comprising when receiving the next command while detecting the consecutive recorded area or the consecutive non-recorded area, interrupting the detection immediately.

16. The method for controlling the optical disc apparatus as defined in claim 13, further comprising when receiving the next command while detecting the consecutive recorded area or the consecutive non-recorded area, interrupting the detection immediately.

* * * * *